(12) United States Patent
Liu

(10) Patent No.: US 10,751,985 B2
(45) Date of Patent: Aug. 25, 2020

(54) FLEXIBLE SUBSTRATE LIFTING DEVICE AND METHOD

(71) Applicant: Wuhan China Star Optoelectronics Semiconductor Display Technology Co., Ltd., Wuhan, Hubei (CN)

(72) Inventor: Dian Liu, Guangdong (CN)

(73) Assignee: WUHAN CHINA STAR OPTOELECTRONICS SEMICONDUCTOR DISPLAY TECHNOLOGY CO., LTD., Wuhan, Hubei (CN)

( * ) Notice: Subject to any disclaimer, the term of this patent is extended or adjusted under 35 U.S.C. 154(b) by 127 days.

(21) Appl. No.: 16/136,846

(22) Filed: Sep. 20, 2018

(65) Prior Publication Data
US 2019/0054728 A1 Feb. 21, 2019

Related U.S. Application Data

(63) Continuation of application No. PCT/CN2017/108690, filed on Oct. 31, 2017.

(30) Foreign Application Priority Data

Aug. 17, 2017 (CN) .......................... 2017 1 0708601

(51) Int. Cl.
*B32B 43/00* (2006.01)
*B32B 38/18* (2006.01)
(Continued)

(52) U.S. Cl.
CPC ............ *B32B 43/006* (2013.01); *B32B 38/10* (2013.01); *B32B 37/0053* (2013.01); *B32B 2315/08* (2013.01); *B32B 2457/206* (2013.01)

(58) Field of Classification Search
USPC ................................................. 156/247, 249
See application file for complete search history.

(56) References Cited

U.S. PATENT DOCUMENTS

2014/0234664 A1\* 8/2014 Yasumoto ........... H01L 21/6836
428/698
2015/0319843 A1\* 11/2015 Lim ...................... H05K 1/189
361/679.32
2016/0347047 A1 12/2016 Eguchi et al.

FOREIGN PATENT DOCUMENTS

CN 101002312 A 7/2007
CN 101154561 A 4/2008
(Continued)

OTHER PUBLICATIONS

English Abstract of JP 10-087160 (Year: 2020).\*
Machine translation of JP 10-087160 (Year: 2020).\*

*Primary Examiner* — Sing P Chan
(74) *Attorney, Agent, or Firm* — Leong C. Lei

(57) ABSTRACT

The present invention teaches a device for lifting a flexible substrate from its glass substrate, including a supply reel, a take-up reel, a lifting roller, and an adhesive tape. The supply reel spins to deliver the adhesive tape. The adhesive tape has a first side and a second side opposite to each other. The lifting roller contacts the second side of the adhesive tape. The lifting roller moves along a lateral direction parallel to the glass substrate and presses the flexible substrate so that the flexible substrate is adhered to the first side of the adhesive tape. The take-up reel spin to retract the adhesive tape and the flexible substrate adhered to the first side of the adhesive tape is lifted from the glass substrate. The lifting device achieves effective and gentle separation of the flexible substrate and the glass substrate through the traction of adhesive tape.

11 Claims, 3 Drawing Sheets

(51) Int. Cl.
*B32B 37/00* (2006.01)
*B32B 38/10* (2006.01)

(56) References Cited

FOREIGN PATENT DOCUMENTS

| | | | | |
|---|---|---|---|---|
| CN | 103317824 A | 9/2013 | | |
| CN | 103786417 A | 5/2014 | | |
| CN | 104347449 A | 2/2015 | | |
| CN | 105047598 A | 11/2015 | | |
| CN | 106098965 A | 11/2016 | | |
| JP | 10087160 A | * 4/1998 | ............ | B65H 41/00 |
| JP | 10172929 A | 6/1998 | | |
| JP | 2011187641 A | 9/2011 | | |
| JP | 2015231869 A | 12/2015 | | |

* cited by examiner

FLEXIBLE SUBSTRATE LIFTING DEVICE AND METHOD

CROSS-REFERENCE TO RELATED APPLICATIONS

This application is a continuing application of PCT Patent Application No. PCT/CN2017/108690, filed on Oct. 31, 2017, which claims priority to Chinese Patent Application No. 201710708601.1, filed on Aug. 17, 2017, both of which are hereby incorporated herein by reference in their entireties.

FIELD OF THE INVENTION

The present invention is generally related to the field of flexible devices, and more particularly to a flexible substrate lifting device and a related lifting method.

BACKGROUND OF THE INVENTION

As technology advances, bendable flexible device is going to be the mainstream for next-generation electronic appliances. Flexible devices such as displays, chips, circuits, power supplies, sensors, etc. provide functions and experiences that are not possible to achieve from conventional electronic appliances. Taking flexible display as example, it has components formed on a substrate made of a flexible material. Specifically, a flexible active-matrix organic light emitting diode (AMOLED) display device would have a flexible substrate formed or attached to a rigid substrate. Then, after forming the components on the flexible substrate, the flexible substrate has to be lifted from the rigid substrate. Therefore, one of the key techniques of producing flexible devices is to effectively lift the flexible substrate from the rigid substrate.

The mainstream approach in lifting flexible AMOLED substrate is through laser ablation, where high-power laser is applied to the interface between flexible polymer substrate and rigid glass substrate to ablate the polymer at the interface so that the flexible substrate and the rigid substrate may be separated. However, after the polymer at the interface is ablated, there is still some slight adhesion between the flexible and rigid substrates. Therefore, to ensure that the flexible substrate is not damaged, some additional measure has to be adopted to fulfill the effective and gentle separation of the flexible substrate and the rigid substrate.

SUMMARY OF THE INVENTION

The present invention teaches a device and a method for lifting flexible substrate. The device and method achieves the effective and gentle separation of the flexible substrate and the rigid substrate through the traction of adhesive tape. The yield for lifting the flexible substrate is enhanced, and the cost is lower as the lifting device is simple and requires little extra expenses.

The present invention teaches a device for lifting a flexible substrate from its glass substrate, including a supply reel, a take-up reel, a lifting roller, and an adhesive tape. The supply reel spins to deliver the adhesive tape. The adhesive tape has a first side and a second side opposite to each other. A circumferential side of the lifting roller contacts the second side of the adhesive tape. The lifting roller moves along a lateral direction parallel to the glass substrate and presses the flexible substrate so that the flexible substrate is adhered to the first side of the adhesive tape. The take-up reel spin to retract the adhesive tape and the flexible substrate adhered to the first side of the adhesive tape is lifted from the glass substrate.

A first guide roller is disposed laterally between the lifting roller and the supply reel, and a second guide roller is disposed laterally between the take-up reel and the lifting roller. The first and second guide rollers spin to deliver the adhesive tape and ensure that the flexible substrate is pressed tightly against the first side of the adhesive tape.

The adhesive tape has a first end connected to the supply reel, and has a second end connected to the take-up reel. The supply reel, the first guide roller, the lifting roller, the second guide roller, and the take-up reel are sequentially and laterally arranged from right to left.

The lifting roller moves to right along a lateral direction parallel to the glass substrate. The supply reel, the first guide roller, the lifting roller, the second guide roller, and the take-up reel spin clockwise around their respective axles.

The locations of the supply reel, the first guide roller, the second guide roller, and the take-up reel within the lifting device are fixed.

The take-up reel spins around its axle to retract the adhesive tape.

The flexible substrate is configured with flexible components.

The adhesive tape is one whose adhesiveness is dissolvable under ultra-violet (UV) light.

The device further includes an UV lighting device, emitting UV light onto the first side of the adhesive tape, causing the first side of the adhesive tape to lose its adhesiveness, thereby lifting the flexible substrate from the adhesive tape.

The present invention also teaches a method for lifting a flexible substrate from its glass substrate, which includes the following steps.

Providing a lifting device including a supply reel, a take-up reel, a lifting roller, an adhesive tape, and an UV lighting device.

Spinning the supply reel at a first speed to provide the adhesive tape.

Moving the lifting roller along a lateral direction parallel to the glass substrate and pressing the flexible substrate, so that the flexible substrate is adhered to a first side of the adhesive tape.

Spinning the take-up reel at a second speed to retract the adhesive tape so that the flexible substrate adhered to the first side of the adhesive tape is lifted from the glass substrate.

Engaging the UV lighting device to project UV light on the first side of the adhesive tape, causing the first side of the adhesive tape to lose its adhesiveness, and the flexible substrate being lifted from the adhesive tape.

The take-up reel spins at a third speed to retract the adhesive tape.

The flexible substrate lifting device and method of the present invention have the flexible substrate adhered to an adhesive tape whose adhesiveness is dissolvable under UV light. The effective and gentle separation of the flexible substrate and the glass substrate is achieved through the traction of adhesive tape. The adhesive side of the adhesive tape is then exposed to UV light so that its adhesiveness disappears. The flexible substrate as such is further lifted from the adhesive tape. The yield for lifting the flexible substrate is enhanced, and the cost is lower as the lifting device is simple and requires little extra expenses.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Figure 1:
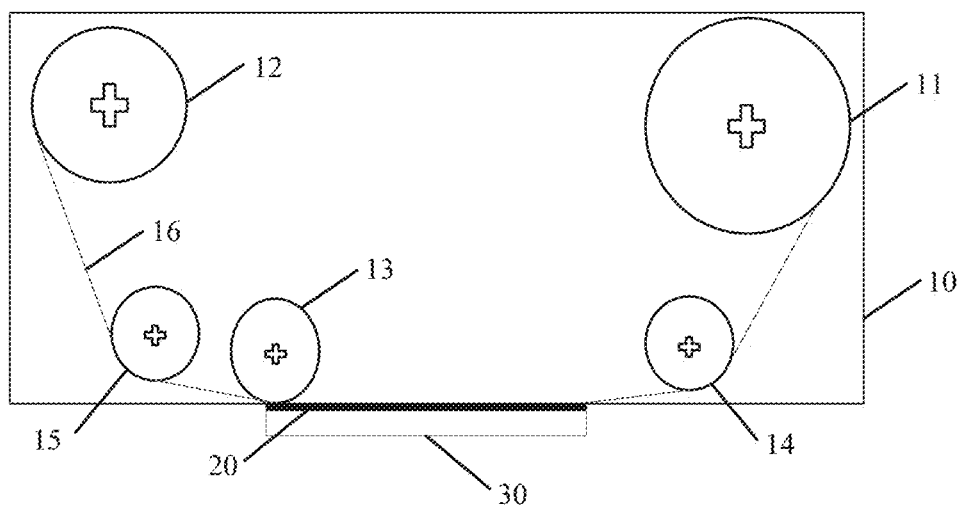
FIG. 1 is a structural schematic diagram showing a lifting device according to an embodiment of the present invention.

The following descriptions for the respective embodiments are specific embodiments capable of being implemented for illustrations of the present invention with referring to appended figures.

In addition, the following embodiments are described in accordance with the accompanied drawings to exemplify specific embodiments of the present invention. Orientation terms such as "up," "down," "front," "back," "left," "right," "in" "out," "lateral", etc. are used in the specification according to the drawings. These terms are intended to better and more clearly explain and understand the present invention. They do not specify or imply that the referred element must have the specific orientation, or must be operated from the specific orientation. They therefore should not be interpreted as limitations to the present invention.

It should be noted that, unless explicitly specified otherwise, terms like "dispose," "join," "connect," etc. should be interpreted broadly. For example, "connect" could mean a fixed connection, a detachable connection, or an integral connection. It may also mean a mechanical connection or an electrical connection. It may be a direct connection, a connection through an intermediate medium, or an internal connection between two elements. For persons skilled in the related art, they should be able to understand the specific meanings of these terms within the context of the present invention.

In addition, unless otherwise specified, the terms "multiple" and "a number of" refer to two or more entities. The term "process" may refer to an independent process or a subset of another process as long as the subset may fulfill the intended function. Furthermore, a numerical range using two values separated by "~" specifies that the range is inclusive of the two values as the range's minimum and maximum. In the drawings, similar or identical elements are denoted by identical reference numerals.

The present invention teaches a device and a method for lifting flexible substrate. The device and method achieves the effective and gentle separation of the flexible substrate and the rigid substrate through the traction of adhesive tape. The yield for lifting the flexible substrate is enhanced, and the cost is lower as the lifting device is simple and requires little extra expenses. Detailed description to the lifting device and method is provided below, together with FIGS. 1 to 3.

As shown in FIG. 1, a lifting device 10 according to an embodiment of the present invention lifts a flexible substrate 20 from a glass substrate 30. The flexible substrate 20 is located on the glass substrate 30. The flexible substrate 20 has a first side (i.e., a bottom side) covering the glass substrate 30, and a second side (i.e., a top side) configured with flexible components (not shown). In the present embodiment, the flexible components include, but are not limited to, organic light emitting diode (OLED), thin film transistor (TFT), etc. Specifically, when the flexible substrate 20 is lifted from the glass substrate 30, the flexible substrate 20 and the flexible components on its second side are lifted altogether from the glass substrate 30.

As shown in FIG. 1, the lifting device 10 of the present embodiment includes a supply reel 11, a take-up reel 12, a lifting roller 13, a first guide roller 14, a second guide roller 15, and an adhesive tape 16.

The supply reel 11 and the take-up reel 12 spin around their respective axles. Specifically, the supply and take-up reels 11 and 12 may spin clockwise or counter-clockwise around their axles. The supply and take-up reels 11 and 12 are immovable. That is, the locations of the supply and take-up reels 11 and 12 within the lifting device 10 are fixed. Furthermore, the supply reel 11 spins to deliver the adhesive tape 16, and the adhesive tape 16 has a first end connected to the supply reel 11. In other words, the supply reel 11 provides the adhesive tape 16. The take-up reel 12 spins to pull the adhesive tape 16, and the adhesive tape 16 has a second end connected to the take-up reel 12. In other words, the take-up reel 12 retracts the adhesive tape 16.

The adhesive tape 16 has a first side and a second side opposite to each other. In the present embodiment, the first side of the adhesive tape 16 is the adhesive side and faces outward away from the axles of the supply and take-up reels 11 and 12, and the second side faces inward towards the axles of the supply and take-up reels 11 and 12.

The lifting roller 13 spins around its axle. Specifically, the lifting roller 13 may spin clockwise or counter-clockwise around its axles. The lifting roller 13 is moveable. That is, the location of the lifting roller 13 within the lifting device 10 may change. The lifting roller 13 is deposed laterally between the supply and take-up reels 11 and 12. A circumferential side of the lifting roller 13 contacts the second side of the adhesive tape 16. The lifting roller 13 has an axial direction perpendicular to a transmission direction of the adhesive tape 16. Specifically, the lifting roller 13 may move perpendicularly relative to the flexible substrate 20 and approaches the flexible substrate 20. Furthermore, the lifting roller 13 may move along a lateral direction parallel to the glass substrate 30 and presses the flexible substrate 20 so that the flexible substrate 20 is adhered to the first side of the adhesive tape 16.

The first guide roller 14 and the second guide roller 15 spin around their respective axles. Specifically, the first and second guide rollers 14 and 15 may spin clockwise or counter-clockwise around their axles. The first and second guide rollers 14 and 15 are immovable. That is, the locations of the first and second guide rollers 14 and 15 within the lifting device 10 are fixed. Furthermore, the first and second guide rollers 14 and 15 spin to deliver the adhesive tape 16. In the present embodiment, the first guide roller 14 is disposed laterally between the lifting roller 13 and the supply reel 11, the second guide roller 15 is disposed laterally between the take-up reel 12 and the lifting roller 13. The first and second guide rollers 14 and 15 ensure that the flexible substrate 20 is pressed tightly against the first side of the adhesive tape 16.

Furthermore, the take-up reel 12 spin to retract the adhesive tape 16 and the flexible substrate 20 adhered to the first side of the adhesive tape 16 is therefore lifted from the glass substrate 30. After the flexible substrate 20 is completely lifted from the glass substrate 30, the glass substrate 30 may be discarded.

In an embodiment, the supply reel 11, the first guide roller 14, the lifting roller 13, the second guide roller 15, and the take-up reel 12 are sequentially and laterally arranged from right to left. Their respective axles may be connected into a U-like shape.

Figure 2:
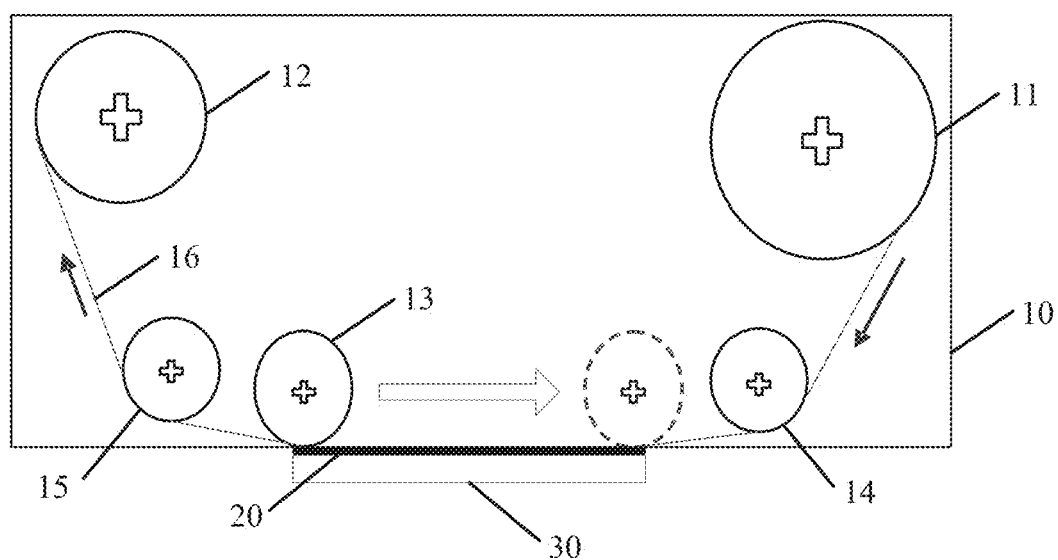
FIG. 2 is a schematic diagram showing the operation of various components of the lifting device of FIG. 1.

In an embodiment, in the process of lifting the flexible substrate 20 from the glass substrate 30 as shown in FIG. 2, the supply reel 11, the first guide roller 14, the lifting roller 13, the second guide roller 15, and the take-up reel 12 spin clockwise around their respective axles. In the meantime, the lifting roller 13 moves laterally to the right parallel with the glass substrate 30.

In an embodiment, the adhesive tape 16 is one whose adhesiveness may be dissolved by exposure to ultra-violet (UV) light. The adhesive tape 16 has an adhesive film of coating thickness 25 um. With the adhesive film of this thickness, the adhesive tape 16 provides a lifting strength 1.2 kg/in$^2$.

In one embodiment, the lifting device 10 further includes an UV lighting device (not shown). After the flexible substrate 20 is completely lifted from the glass substrate 30, the flexible substrate 20 and the adhesive tape 16 are exposed to the UV light emitting from the UV lighting device. The adhesiveness of the first side of the adhesive tape 16 dissolves under the UV light. The adhesive film on the first side of the adhesive tape 16 falls off. It should be noted that there would be no residual adhesive by applying UV light to the adhesive tape 16. Therefore, the flexible substrate 20 may be further lifted from the adhesive tape 16. Up to this stage, the process of lifting the flexible substrate 20 is completed. In one embodiment, the time for exposing the first side of the adhesive tape 16 to the UV light is 10 seconds.

It should be noted that, after the flexible substrate 20 is completely lifted from the adhesive tape 16, the take-up reel 12 retracts the already used adhesive tape 16.

In an embodiment, the lifting device 10 further includes a base member (not shown) where the various components of the lifting device 10 are disposed. The base member also drives the supply reel 11, the first guide roller 14, the lifting roller 13, the second guide roller 15, and the take-up reel 12 spin clockwise or counter-clockwise around their respective axles. The base member also drives the lifting roller 13 to move perpendicularly up or down relative to the flexible substrate 20, and to move left or right along a lateral direction parallel to the flexible substrate 20 (or the glass substrate 30). The flexible substrate 20 then may be lifted from the glass substrate 30. The base member may also drive the UV lighting device to move relative to the flexible substrate 20 so as to lift the flexible substrate 20 from the adhesive tape 16.

In an embodiment, the lifting device 10 further includes a support member (not shown) where the glass substrate 30, together with the attached flexible substrate 20, is positioned. The support member also supports the flexible substrate 20 after being lifted from the glass substrate 30 and still adhered to the first side of the adhesive tape 16.

It should be noted that a laser lift-off (LLO) layer (not shown) is disposed between the flexible substrate 20 and the glass substrate 30. In an embodiment, the LLO layer is made of a polymer whose main chain includes imide group (—CO—N—CO—) (i.e., polyimide, PI). In addition, the flexible substrate 20 is made of a same material as the LLO layer. Before the lifting device 10 is applied to lift the flexible substrate 20 from the glass substrate 30 as shown in FIG. 1, a LLO technique may be used, where a laser light is projected to the glass substrate 30 so as to ablate the LLO layer and achieve a preliminary lifting of the flexible substrate 20 from the glass substrate 30. In an embodiment, the laser light has an energy density of 270-300 mJ/cm$^2$, an overlap rate of 50%, and a wavelength of 308 nm or 343 nm.

After the LLO layer is ablated by laser, there is still some inter-molecular force between the flexible substrate 20 and the glass substrate 30. In addition, there is a little amount of air between the LLO layer and glass substrate 30, leading to a greater negative pressure when lifting a large-size flexible substrate 20. As such, there is some slight adhesion remaining between the flexible substrate 20 and the glass substrate 30 after the LLO layer is ablated by laser. Then, by applying the lifting device 10 of FIG. 1 to adhere the flexible substrate 20 to the UV-dissolvable adhesive tape 16, a gentle and effective lifting of the flexible substrate 20 from the glass substrate 30 is firstly achieved under the pull of the adhesive tape 16 without damaging the flexible substrate 20. Then by the exposure to UV light to dissolve the adhesive tape 16, the further lifting of the flexible substrate 20 from the adhesive tape 16 is achieved. Finally, the complete lifting of the flexible substrate 20 is accomplished.

Figure 3:
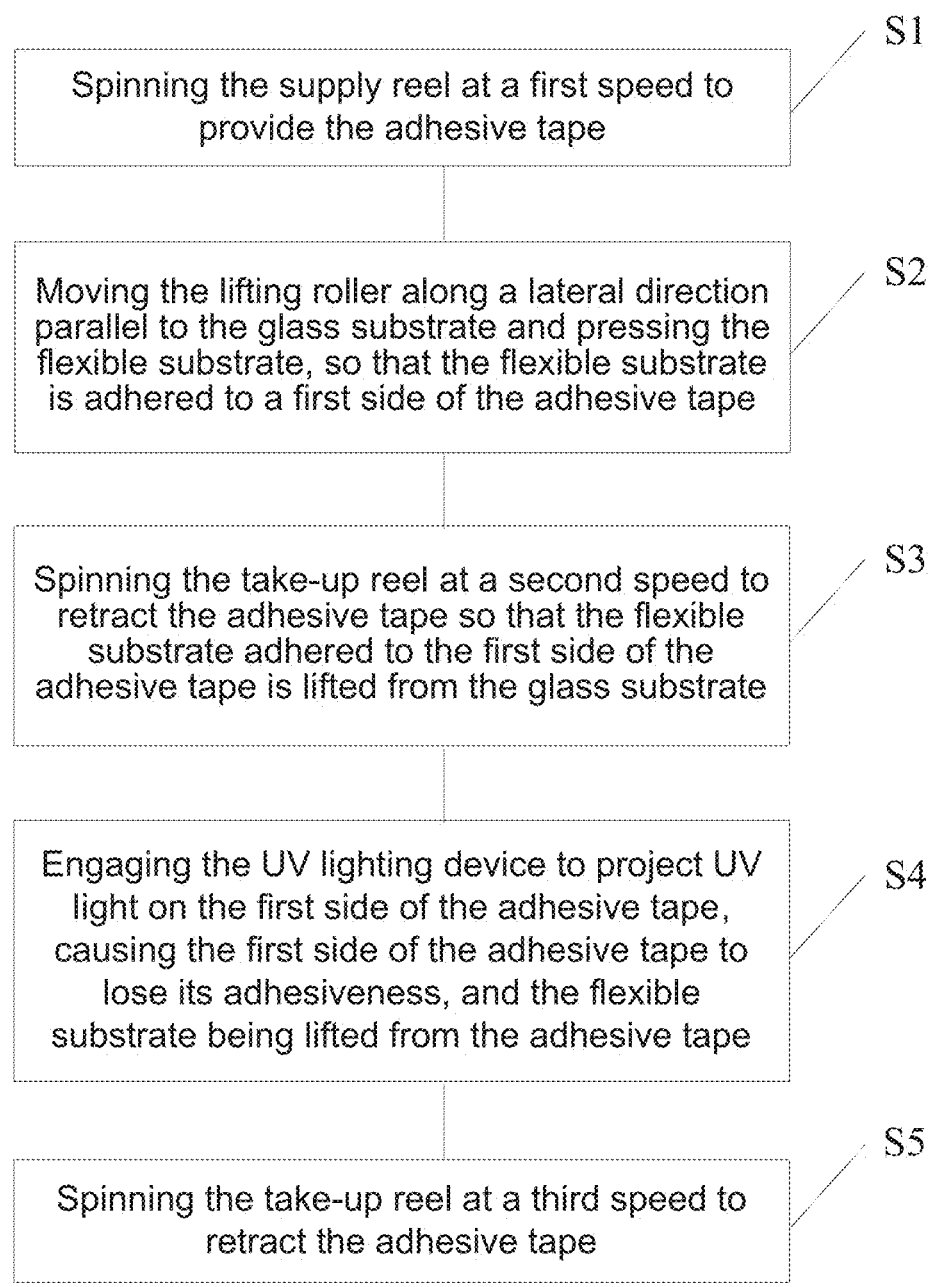
FIG. 3 is a flow diagram showing a method of using the lifting device of FIG. 1 to lift a flexible substrate from its glass substrate according to an embodiment of the present invention.

FIG. 3 is a flow diagram showing a method of using the lifting device of FIG. 1 to lift a flexible substrate from its glass substrate according to an embodiment of the present invention. As illustrated, the method includes the following steps.

S1: Spinning the supply reel at a first speed to provide the adhesive tape.

In an embodiment, the supply reel 11 spins at the first speed clockwise to deliver un-used adhesive tape 16. As the adhesive tape 16 is delivered, it sequentially passes through the first guide roller 14, the lifting roller 13, the second guide roller 15, and the take-up reel 12.

S2: moving the lifting roller along a lateral direction parallel to the glass substrate and pressing the flexible substrate, so that the flexible substrate is adhered to the first side of the adhesive tape.

The adhesive tape 16 has the first side and the second side opposite to each other. The lifting roller 13 contacts the second side of the adhesive tape 16. The first side of the adhesive tape 16 is the adhesive side and the flexible substrate 20 is adhered to the adhesive side of the adhesive tape 16.

In an embodiment, the method further includes the step of moving the lifting roller 13 perpendicularly relative to the flexible substrate and approaching the flexible substrate 20. Furthermore, the lifting roller 13 is moved from left to right along the lateral direction parallel to the glass substrate 30 to press the flexible substrate 20 so that the flexible substrate 20 is adhered to the first side of the adhesive tape 16.

The first guide roller 14 is disposed laterally between the lifting roller 13 and the supply reel 11, the second guide roller 15 is disposed laterally between the take-up reel 12 and the lifting roller 13. The first and second guide rollers 14 and 15 ensure that the flexible substrate 20 is pressed tightly against the first side of the adhesive tape 16.

S3: spinning the take-up reel at a second speed to retract the adhesive tape so that the flexible substrate adhered to the first side of the adhesive tape is lifted from the glass substrate.

It is understandable that the take-up reel 12 also spins clockwise to retract the adhesive tape 16. As the flexible substrate 20 is adhered to the first side of the adhesive tape 16, and as the take-up reel 12 spins at the second speed clockwise to reel in the adhesive tape 16, the pull by the adhesive tape 16 lifts the flexible substrate 20 adhered to the first side of the adhesive tape 16 is lifted from the glass substrate 30.

S4: engaging the UV lighting device so that it project UV light on the first side of the adhesive tape, causing the first side of the adhesive tape to lose its adhesiveness, and the flexible substrate being lifted from the adhesive tape.

After the flexible substrate 20 is lifted from the glass substrate 30, the flexible substrate 20 is still adhered to the first side of the adhesive tape 16. Since the adhesive tape 16 is one whose adhesiveness may be dissolved by exposure to UV light, the UV lighting device is engaged to emit UV light onto the first side of the adhesive tape 16. The first side of the adhesive tape 16 as such loses its adhesiveness, and the adhesive film on the first side of the adhesive tape 16 falls off, thereby lifting the flexible substrate 20 from the adhesive tape 16.

S5: spinning the take-up reel at a third speed to retract the adhesive tape.

The second end of the adhesive tape is connected to the take-up reel 12. Therefore, the take-up reel 12 spins to retract the adhesive tape 16 (i.e., the already used adhesive tape 16). In the present embodiment, after the flexible substrate 20 is lifted from the adhesive tape 16, the take-up reel 12 spins at the third speed clockwise to retract the adhesive tape 16.

The present invention teaches a device and a method for lifting flexible substrate. The device and method first achieve preliminary lifting of the flexible substrate through laser ablation. Then, the flexible substrate is adhered to an adhesive tape whose adhesiveness is dissolvable under UV light. The effective and gentle separation of the flexible substrate and the glass substrate is further achieved through the traction of adhesive tape. The adhesive side of the adhesive tape is then exposed to UV light so that its adhesiveness disappears. The flexible substrate as such is further lifted from the adhesive tape. The yield for lifting the flexible substrate is enhanced, and the cost is lower as the lifting device is simple and requires little extra expenses.

In the present specification, phrases such as "an embodiment," "some embodiments," "an example," "some examples," etc. means that their specified characteristic, structure, material, or feature described may be independently applied or jointly combined in at least one embodiment of the present invention. These phrases also are not necessarily refer to a same embodiment. Their characteristics, structures, materials, or features may be appropriately integrated in one or more embodiments.

Above are embodiments of the present invention, which does not limit the scope of the present invention. Any equivalent amendments within the spirit and principles of the embodiment described above should be covered by the protected scope of the invention.

What is claimed is:

1. A device for lifting a flexible substrate from a glass substrate, comprising a supply reel, a take-up reel, a lifting roller, and an adhesive tape, wherein
   the supply reel, the lifting roller, and the take-up reel are sequentially and laterally arranged from right to left and spin clockwise respectively;
   locations of the supply reel and the take-up reel within the lifting device are fixed;
   the adhesive tape has a first end connected to the supply reel, and has a second end connected to the take-up reel, and the adhesive tape has a first side and a second side opposite to each other;
   the supply reel spins to deliver the adhesive tape; a circumferential side of the lifting roller contacts the second side of the adhesive tape; the lifting roller moves to right along a lateral direction parallel to the glass substrate and presses the flexible substrate so that the flexible substrate is adhered to the first side of the adhesive tape; and the take-up reel spin to retract the adhesive tape and the flexible substrate adhered to the first side of the adhesive tape is lifted from the glass substrate.

2. The device according to claim 1, further comprising a first guide roller fixedly disposed laterally between the lifting roller and the supply reel and a second guide roller fixedly disposed laterally between the take-up reel and the lifting roller; wherein the first and second guide rollers spin clockwise to deliver the adhesive tape and ensure that the flexible substrate is pressed tightly against the first side of the adhesive tape.

3. The device according to claim 2, wherein the adhesive tape is one whose adhesiveness is dissolvable under UV light.

4. The device according to claim 1, wherein the flexible substrate is configured with flexible components.

5. The device according to claim 1, wherein the adhesive tape is one whose adhesiveness is dissolvable under ultraviolet (UV) light.

6. The device according to claim 5, further comprising an UV lighting device, emitting UV light onto the first side of the adhesive tape, causing the first side of the adhesive tape to lose adhesiveness, thereby lifting the flexible substrate from the adhesive tape.

7. A method for lifting a flexible substrate from a glass substrate, comprising
   providing a lifting device including a supply reel, a take-up reel, a lifting roller, an adhesive tape, and an UV lighting device, where the adhesive tape has a first side and a second side opposite to each other, the adhesive tape has a first end connected to the supply reel, and has a second end connected to the take-up reel, and the supply reel, the lifting roller, and the take-up reel are sequentially and laterally arranged from right to left, and the supply reel, the lifting roller, and the take-up reel spin clockwise respectively;
   spinning the supply reel at a first speed to provide the adhesive tape;
   moving the lifting roller to right along a lateral direction parallel to the glass substrate and pressing the flexible substrate, so that the flexible substrate is adhered to a first side of the adhesive tape;
   spinning the take-up reel at a second speed to retract the adhesive tape so that the flexible substrate adhered to the first side of the adhesive tape is lifted from the glass substrate;
   engaging the UV lighting device to project UV light on the first side of the adhesive tape, causing the first side of the adhesive tape to lose adhesiveness, and the flexible substrate being lifted from the adhesive tape; and
   spinning the take-up reel at a third speed to retract the adhesive tape.

8. The method according to claim 7, wherein a circumferential side of the lifting roller contacts the second side of the adhesive tape.

9. The method according to claim 7, wherein a first guide roller is fixedly disposed laterally between the lifting roller and the supply reel; a second guide roller is fixedly disposed laterally between the take-up reel and the lifting roller; and the first and second guide rollers spin clockwise to deliver the adhesive tape and ensure that the flexible substrate is pressed tightly against the first side of the adhesive tape.

10. The method according to claim 7, wherein the flexible substrate is configured with flexible components.

11. The method according to claim 7, wherein the adhesive tape is one whose adhesiveness is dissolvable under UV light.

* * * * *